United States Patent [19]

Brown et al.

[11] 3,811,332
[45] May 21, 1974

[54] AUTOMATIC TENSIONING DEVICE
[75] Inventors: Martin S. Brown, Plainfield; Stellios A. Avramidis, Greenfield, both of Ind.
[73] Assignee: FMC Corporation, San Jose, Calif.
[22] Filed: Aug. 22, 1972
[21] Appl. No.: 282,826

[52] U.S. Cl. .................................... 74/242.11 S
[51] Int. Cl. ................................ F16h 7/12
[58] Field of Search ........... 74/242.15 R, 242.11 R, 74/242.11 P, 242.11 S

[56] References Cited
UNITED STATES PATENTS
| | | | |
|---|---|---|---|
| 2,210,276 | 8/1940 | Bremer | 74/242.11 S |
| 3,069,920 | 12/1962 | Cole et al. | 74/242.11 S |
| 3,575,058 | 4/1971 | Kraus | 74/242.11 R |
| 3,673,884 | 7/1972 | Southiere | 74/242.11 S |

FOREIGN PATENTS OR APPLICATIONS
| | | | |
|---|---|---|---|
| 33,571 | 4/1927 | France | 74/242.15 R |

Primary Examiner—Leonard H. Gerin
Attorney, Agent, or Firm—C. E. Tripp; J. F. Verhoeven

[57] ABSTRACT

A dual tensioning device is provided to take up the slack on an endless belt or chain regardless of the direction of drive. A pair of arms are pivoted at a common point outside the loop defined by the endless belt or chain. Each arm has a friction pad pivotally mounted at the outer end, and the ends of the arms, which are of unequal length, are connected by a tension spring. The longitudinal axis of the spring is inclined at different angles to the arms when the endless belt or chain is driven in a normal operating direction so that a greater tensioning force is applied to the slack side of the belt or chain.

6 Claims, 3 Drawing Figures

PATENTED MAY 21 1974　　　　　　　　　　　　　　　　　3,811,332
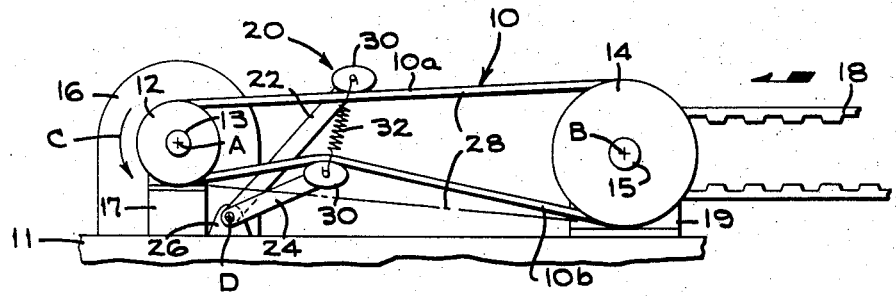
FIG_1
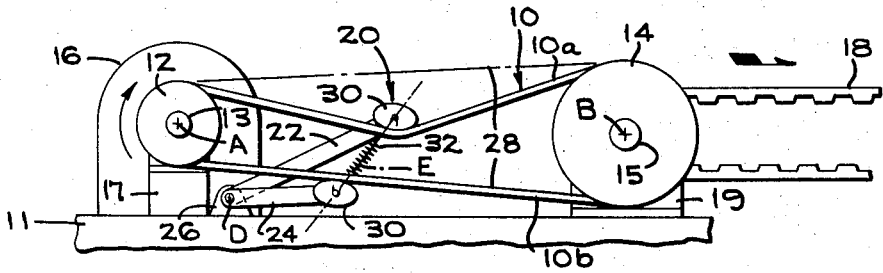
FIG_2
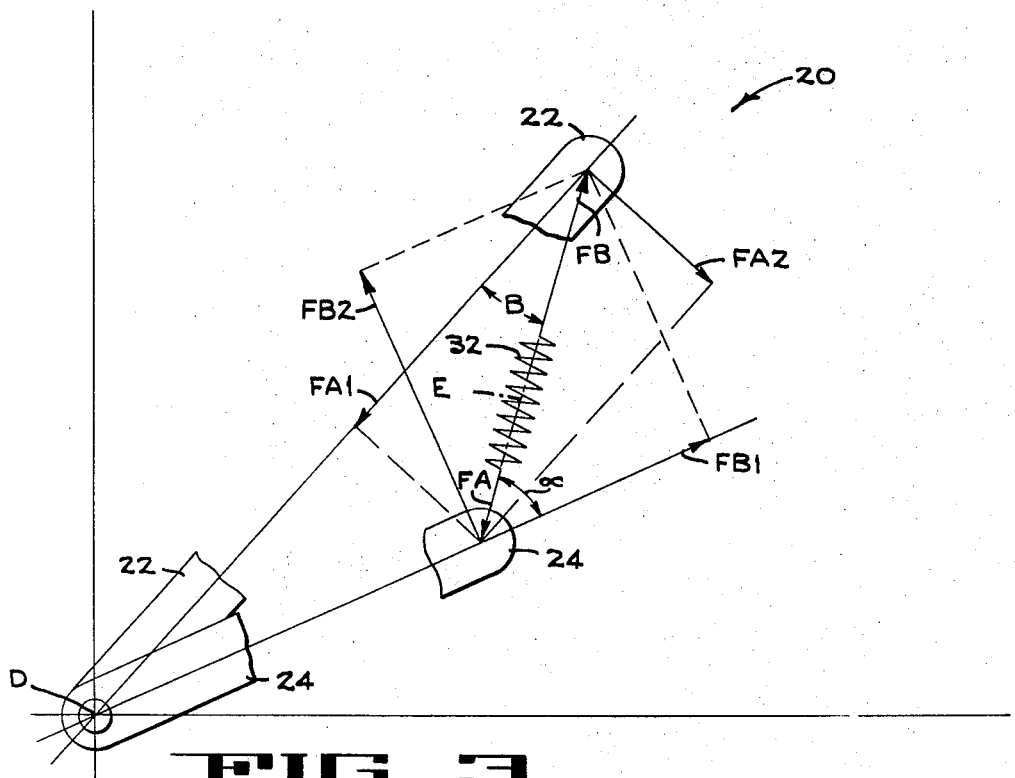
FIG_3

AUTOMATIC TENSIONING DEVICE

BACKGROUND OF THE INVENTION

In a typical tensioning device for an endless belt or chain, a roller or friction member is urged, as by a spring, against one run of the chain or belt to remove the slack therefrom. If the drive to the flexible drive chain or belt is reversed, the former slack run of the endless flexible drive member becomes the tension side. As the slack is removed during reversal of the direction of drive, the tensioning member is urged back against the spring, increasing the force exerted by the spring. Thus, the force exerted against the one run of the endless flexible drive member is greater when the run is under tension than when the run is slack. It is, however, when the run of the chain or belt is slack that the greatest force is needed to prevent excessive looseness in the chain or belt. On the other hand, when the run is under tension, a greater force exerted by the friction member only increases wear.

It is known to provide two pivotal tensioning arms, each adapted to tension one run of an endless flexible drive member, as shown in patents U.S. Pat. No. 525,118, U.S. Pat. No. 976,115 and U.S. Pat. No. 2,945,393. In the mechanisms shown in these patents, a tension spring is connected between the ends of two arms to exert generally equal forces on the tension and slack side of the chain or belt, regardless of which run of the flexible drive member is under tension and which run is slack.

SUMMARY OF THE INVENTION

In the present invention, a bi-directional automatic tensioner is provided in which a greater force is exerted on the slack run of the chain or belt than on the tension run thereof when the chain or belt is driven in the normal operating direction.

In the preferred form of the invention, the two tensioning arms are mounted on a common pivot axis which is displaced to one side of the endless drive member. A tension spring extends between the two arms and is connected to the arms at points spaced different distances from the common pivot axis of the arms. Thus, the spring lies on a longitudinal spring axis which makes different angles with the two arms. Although the spring exerts equal but opposite forces on the arms, the forces applied through the arms to the opposite runs of the chain or belt will differ because of the substantial difference in the angle between the spring and the two arms.

Specifically, the tensioning arm which operates on the tension run of the chain or belt, when that member is operating in a normal operating direction, makes a smaller included angle with the spring axis than the arm which operates on the slack side of the chain or belt. In other words, the spring axis lies closer to a line perpendicular to the slack run arm than to a line perpendicular to the tension run arm. Thus, when the belt or chain is running in the normal operating direction, more force is exerted by the spring through the slack run arm to the chain or belt on the slack run than is exerted through the tension run arm to the chain or belt on the tension run of the chain or belt.

It is therefore one object of the present invention to exert a greater tensioning force on the slack run of an endless chain or belt than on the tension run of said endless member as the belt runs in a normal operating direction.

It is another object of the present invention to reduce the wear on an endless drive chain or belt by reducing the force exerted on the tension run of the endless member as that member runs in a normal operating direction.

BRIEF DESCRIPTION OF THE DRAWINGS

FIG. 1 is a view in elevation of the tensioning device of the present invention engaged with a belt being driven in a normal operating direction.

FIG. 2 is a view similar to the view of FIG. 1 except with the belt being driven in the reverse direction.

FIG. 3 is a diagram of the forces exerted by the spring on the arms when the chain is driven as in FIG. 1.

DESCRIPTION OF THE PREFERRED EMBODIMENT

There is shown in FIG. 1 an endless flexible drive belt member 10 which is mounted on a drive pulley 12 and a driven pulley 14. The pulleys 12 and 14 are mounted on shafts 13 and 15, respectively, which are journaled in supports 17, 19 mounted on a frame 11 (which may, for example, be the chassis of a snowmobile). The shafts 13 and 15 lie, respectively, on spaced apart, parallel axes A and B. The drive pulley is driven by an engine (which may, for example, be a snowmobile engine) or other source of power indicated at 16, and the driven pulley is connected to a device to be driven, or some other load (which may, for example, be a snowmobile track) indicated at 18. The engine 16 drives the pulley 12 in a counterclockwise direction (as indicated by arrow C) during normal operation to drive the load in a normal operating direction. The engine, however, is reversible to reverse the load, if necessary. It will be understood that insofar as the tensioning device of the present invention is concerned the endless flexible member 10 could as well be a chain and the pulleys 12 and 14 could as well be sprockets.

While the engine is driving the load through the endless belt or chain in the normal operating direction, as shown in FIG. 1, the upper run 10a of the belt or chain is under tension and the lower run 10b is slack. During reverse operation of the load, as shown in FIG. 2, the lower run 10b of the endless member is under tension and the upper run 10a is slack.

A tensioning device 20 is provided which takes up the slack in the flexible member 10 in either direction of rotation of the member 10. The tensioning device has an upper arm 22 to engage the upper run 10a of the belt or chain 10 and a lower arm 24 to engage the lower run 10b thereof. The arms are pivotally mounted on a common axis D on a support 26 which may, for example, be mounted at a point on the frame of the snowmobile if the drive is used in such a vehicle. Axis D extends parallel to the axes A and B on which pulleys 12 and 14, respectively, are mounted. The axis D is spaced from the axes A and B and, preferably, is outside the envelope 28 defined by the path a chain or belt would take if both sides of that member were tight. In other words, the common pivotal axis D of the two tensioning arms 22, 24 is outside the endless loop of the flexible member regardless of which run thereof is under tension.

The axis D, in the illustrated embodiment of the invention, is below the lower run 10b of the belt or chain.

The upper arm 22 is, therefore, substantially longer than the lower arm 24. At the end of each arm, there is pivotally mounted an oval-shaped pad, or friction member, 30. A coiled spring 32, having a longitudinal axis E, connects the two ends of the arms 22, 24, and the spring is under tension when the two pads 30 are engaged with the outsides of the upper and lower runs of the flexible endless member 10.

As shown best in FIG. 3, the tensioned spring exerts equal and opposite forces FA, FB on the arms 22, 24 respectively. Considering the condition of the drive mechanism shown in FIG. 1, where the load is driven in a normal operating direction, each force FA, FB may be resolved into two force components FA1, FA2 and FB1, FB2, respectively. The force components FA1 and FB1 are taken along the arms 22, 24 respectively and the force components FA2, FB2 are taken perpendicular to the arms. It will be noted that the force components FA1 and FB1 act along the arms and must be taken up at the pivotal connection to support 26. Thus, these force components have no effect on the runs of the flexible member 10. The force components FA2, FB2 perpendicular to the arms, however, exert forces on the arms which are transferred directly to the runs of the flexible member 10.

It will be noted that during normal operation of the load, the force component FA2 of the upper arm is considerably smaller than the force component FB2 of the lower arm. Thus, there is little force transmitted from the pad 30 at the end of the upper arm to the tension side of the belt or chain, which, since it is under tension, requires little tensioning force to dampen slapping or vibration thereof.

Although the spring exerts equal forces on the arms, the force component exerted on the slack side of the belt or chain by the pad 30 on the lower arm 24 is considerably greater than the force exerted by the pad on the upper arm to the tension side of the belt or chain. The significantly greater force on the slack side of the flexible member 10 results from the fact that the component of spring force perpendicular to lower arm 24 is greater than the component of spring force perpendicular to the upper arm 22. The perpendicular components of force differ because the angle the spring makes with the arms differs. It will be noted that under normal operating conditions, the spring makes a larger angle $\alpha$ with arm 24 (that is, an angle closer to the perpendicular to arm 24) than with arm 22 (B).

Although the best mode contemplated for carrying out the present invention has been herein shown and described, it will be apparent that modification and variation may be made without departing from what is regarded to be the subject matter of the invention.

What is claimed is:

1. A dual tensioning device to operate on the tension and slack sides of a reversible endless flexible drive member received on members rotatable about spaced apart axes, the combination comprising a frame, a first arm pivotally mounted on a pivot point on the frame spaced from said axes and located outside of the path of the endless flexible member, said first arm having means thereon to engage one side of the flexible drive member which is under tension when the drive member is running in a normal operating direction, a second arm pivotally mounted at said pivot point on the frame and having means thereon to engage the other side of the flexible drive member which is slack when the drive member is running in a normal operating direction, a spring connected to said first arm at a first point and connected to said second arm at a second point to create equal and opposite forces on said arms along the longitudinal axis of said spring and between the points where the spring is connected to the arms, said first and second spring connection points located at positions on said arms where the axis of the spring makes a smaller angle with said first arm than with said second arm when said one side of the drive member is under tension and running in its normal operating direction, whereby a component of force perpendicular to the axis of the second arm and exerted against the slack side of the flexible drive member is greater than the component of force perpendicular to the first arm and exerted against the tension side of the flexible drive member.

2. The dual tensioning device of claim 1 in which said arms pivot to accommodate the new path of the flexible drive member when the direction of drive member operation is reversed to reverse the tension and slack sides of the drive member.

3. The dual tensioning device of claim 1 in which said means on the arms to engage the sides of the flexible drive member are pads.

4. The dual tensioning device of claim 3 in which said pads are pivotally mounted on the arms and are contoured to accommodate the slack side of the chain.

5. A dual tensioning device to operate on the tension and slack side of an endless flexible drive member received on members rotatable about spaced apart axes, the combination comprising a frame, a first arm pivotally mounted at a pivot point on the frame spaced from said aces, said first arm having means thereon to engage the one side of the flexible drive member which is under tension when the drive member is running in a normal operating direction, a second arm pivotally mounted at said pivot point on the frame and having means thereon to engage the other side of the flexible drive member which is slack when the drive member is running in a normal operating direction, said arms being of different length, a spring connected between the ends of said arms to create equal and opposite forces on said arms along the longitudinal axis of said spring, said spring axis forming a smaller angle with said first arm than with said second arm when said one side of the drive member is under tension whereby a greater force is exerted against the slack side of the flexible drive member than against the tension side thereof.

6. A dual tensioning device to operate on the tension and slack sides of a reversible endless flexible drive member received on members rotatable about spaced apart axes, the combination comprising a frame, a first arm pivotally mounted on a pivot point on the frame spaced from said axes and located outside of the path of the endless flexible drive member, said first arm having means thereon to engage one side of the flexible drive member which is under tension when the drive member is running in a normal operating direction, a second arm pivotally mounted at said pivot point on the frame and having means thereon to engage the other side of the flexible drive member which is slack when the drive member is running in a normal operating direction, a spring connected to said first arm at a first spring connection point and connected to said second arm at a second spring connection point to create equal and opposite forces on said arms along the longitudinal axis of said spring and between said spring connection points, said first and second spring connection points located at positions spaced different distances from said pivot point to form a smaller angle between said spring axis and said first arm when said one side of the drive member is under tension and running in its normal operating direction, whereby a component of force perpendicular to the axis of the second arm and exerted against the slack side of the flexible drive member is greater than the component of force perpendicular to the first arm and exerted against the tension side of the flexible drive member.

* * * * *